(12) United States Patent
Eschbach

(10) Patent No.: US 7,649,650 B2
(45) Date of Patent: Jan. 19, 2010

(54) MATCHING THE PERCEPTION OF A DIGITAL IMAGE DATA FILE TO A LEGACY HARDCOPY

(75) Inventor: Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 592 days.

(21) Appl. No.: 11/320,263

(22) Filed: Dec. 22, 2005

(65) Prior Publication Data
US 2007/0146830 A1 Jun. 28, 2007

(51) Int. Cl.
G06F 15/00 (2006.01)
(52) U.S. Cl. ................. 358/1.9; 358/448; 358/401; 382/164
(58) Field of Classification Search .............. 358/1.9, 358/448, 401; 382/164
See application file for complete search history.

(56) References Cited

U.S. PATENT DOCUMENTS 6,803,921 B1 * 10/2004 Balasubramanian et al. 345/597
2004/0096102 A1 * 5/2004 Handley ................ 382/164
2004/0264781 A1 12/2004 Eschbach et al.
2005/0134934 A1 * 6/2005 Unal et al. ............. 358/448

* cited by examiner

Primary Examiner—Twyler L Haskins
Assistant Examiner—Michael Burleson
(74) Attorney, Agent, or Firm—Fay Sharpe LLP

(57) ABSTRACT

A system/method for generating one or more new hardcopy prints from an electronic file comprising original digital image data, wherein the new hardcopy print(s) match a legacy hardcopy previously generated from the original digital image data of the electronic file, even when the legacy hardcopy was printed from an "enhanced" or "tuned" version of the original image data. The original image data and scanner data derived by scanning the legacy hardcopy are used to identify corresponding areas of constant color in the original data and the legacy hardcopy. The corresponding color areas are represented in a colorimetric color space and the original data color values are adjusted to match the legacy hardcopy color values. The adjusted data are used to print a new hardcopy. The colorimetric color space conversion is completed using a plurality of different printing device assumptions, and the printing device assumption resulting in the smallest starting color difference between the original color values and legacy hardcopy color areas is used for the color matching process.

20 Claims, 3 Drawing Sheets

MATCHING THE PERCEPTION OF A DIGITAL IMAGE DATA FILE TO A LEGACY HARDCOPY

BACKGROUND

It is not uncommon that a person possesses a legacy hardcopy that is deemed satisfactory or even ideal, and also possesses the original electronic file comprising the digital image data on which the legacy hardcopy is based, and now desires to print one or more hardcopies that match the legacy hardcopy. A problem arises when the legacy hardcopy is not merely a print-out of the raw digital image data of the electronic file but is, instead, a print of an enhanced version of the digital image data of the electronic file. For example, the legacy hardcopy can be a printed version of the original digital image data that was enhanced by a technician to make the ocean more blue, to make a sunset more orange, to make a headline font more red, etc.

One approach to the problem is to scan the legacy hardcopy to derive scanner image data from which the new hardcopies can be printed, essentially copying the hardcopy data. One drawback of this method is that the legacy hardcopy might include artifacts such as fold-lines, coffee stains or other physical marks that must be excluded from any newly generated hardcopy. Another drawback associated with the use of a scanner is that the original image data of the electronic file is, by definition, a perfect match to the legacy hardcopy, except for the above-noted image enhancement, while data derived from scanning the legacy hardcopy will include noise that will degrade the quality of any subsequent prints.

Accordingly, a need has been identified for a system that allows new hardcopies to be printed from the original image data, wherein the new hardcopies are perceived to match the legacy hardcopy.

SUMMARY

In accordance with one aspect of the present development, a method for color matching original image data to a printed hardcopy document previously generated from the original image data comprises: inputting the original image data; scanning the printed hardcopy to derive and input scanner image data that represent the printed hardcopy; identifying constant color objects in the original image data; for the constant color objects in the original image data, identifying respective corresponding hardcopy color areas in the scanner image data; analyzing color differences between the constant color objects and the corresponding hardcopy color areas to determine a printing device assumption to predict a printing device on which the printed hardcopy document was previously printed; based upon the predicted printing device, converting at least the constant color objects and the respectively corresponding hardcopy color areas into a colorimetric color space; adjusting a color of at least one of the constant color objects to match a corresponding color of the respectively corresponding hardcopy color area in the colorimetric color space.

In accordance with another aspect of the present development, a method for printing a new hardcopy using a legacy hardcopy and an electronic file of the original image data is provided, wherein the legacy hardcopy was printed from a modified version of the original image data. The method comprises: inputting the original image data into an image processing unit; scanning the legacy hardcopy to derive scanner data that describe the legacy hardcopy and inputting the scanner data into the image processing unit; identifying a plurality of different color objects in the original image data; identifying a plurality of different color areas in the scanner data, wherein the plurality of color areas correspond respectively to and result from the plurality of color objects identified in the original image data, wherein the color objects and the color areas corresponding respectively thereto define a plurality of color pairs; converting the color pairs into a colorimetric color space; for at least one color pair, adjusting an average color of the color object to match a corresponding average color of the corresponding color area so as to define adjusted image data; printing the new hardcopy using the adjusted image data.

In accordance with another aspect of the present development, a printing method comprises: inputting an electronic file comprising original digital image data; scanning a printed legacy hardcopy image that was previously printed from the electronic file to derive scanner image data; identifying a constant color object in the original digital image data; identifying a corresponding color area in the scanner image data that corresponds to the constant color object; defining an adjusted electronic file comprising adjusted digital image data that represent the legacy hardcopy by adjusting a color of the constant color object in the original digital image data to match a corresponding color of the corresponding color area; printing a new hardcopy using the adjusted digital image data.

BRIEF DESCRIPTION OF THE DRAWINGS

The development comprises various steps and/or components and/or arrangements of same, embodiments of which are illustrated in the accompanying drawings that form a part hereof, wherein.

DETAILED DESCRIPTION

The present development provides a system and/or method for generating one or more new hardcopy prints from an electronic file comprising original digital image data, wherein the new hardcopy print(s) match a legacy hardcopy previously generated from the original digital image data of the electronic file, even when the legacy hardcopy was printed from an "enhanced" or "tuned" version of the original image data, i.e., from a version of the original image data wherein color was adjusted smoothly to provide the legacy hardcopy with certain desired visual characteristics.

The present development requires that four separate assumptions be satisfied: (i) a correspondence assumption, i.e., the electronic file is the fundamental source for the legacy hardcopy; (ii) a satisfaction assumption, i.e., the person requesting one or more new hardcopies to match the legacy hardcopy is satisfied with certain aspects of the legacy hardcopy, even if he/she cannot articulate these satisfactory aspects; (iii) a marking technology assumption, i.e., the legacy hardcopy was printed using a known conventional marking (printing) technology known in the art (e.g., offset, xerography, inkjet, etc.) rather than by hand or using some unconventional printing technique; (iv) a small perturbation assumption, i.e., any enhancement of the original image data of the electronic file to produce the legacy hardcopy was a limited and rational and smooth tuning of the original image data rather than a radical or arbitrary operation. These four assumptions have a very high probability of being true in real-world imaging applications. If any of the above assumptions is not satisfied, the process generally cannot be completed.

Figure 1:
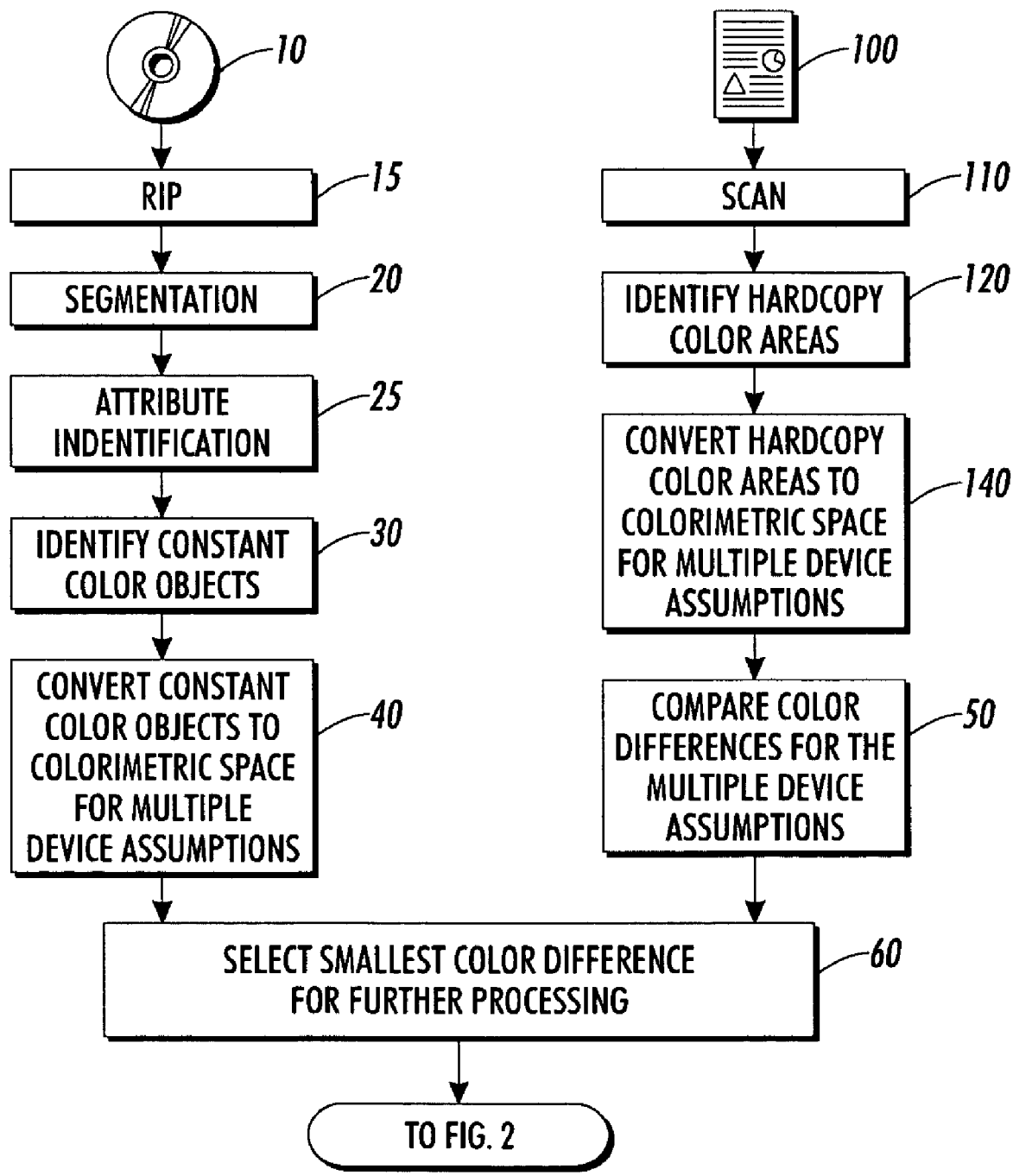
FIG. 1 is a diagrammatic illustration of a first portion of a system and method in accordance with the present development.

FIG. 1 discloses a first aspect of the present development. The electronic file 10 comprising the original digital image data, which can be supplied on a diskette, compact disk, portable memory device, or by a network connection or by other means, is input to a raster image processor (RIP) 15, wherein the original image data are RIPped into "raw" raster image data, if not already in raster form, so that all page description language (PDL) elements are converted to pixel data using associated cyan, magenta, yellow, black (cmyk) values. If the original image data are already in a raster form, e.g., cmyk TIFF data, the RIP process is skipped.

In a step 20, the raster data are segmented into pixel-based objects as is generally known in the digital imaging art, wherein each segmented object is defined by a discrete region of pixels defining a particular type of object, e.g., text, a continuous tone photograph, a raster image, a graphics object, a halftone image, a background object, etc. It should be noted that this segmentation step is greatly simplified by the existence of the electronic original. The electronic original object sizes and locations can directly be used to identify the corresponding page areas in the hardcopy scan. Using the correspondence assumption above, one knows that simple spatial transforms (scale, rotation, small shears, and the like) can create spatial correspondence between scan and electronic data and that the labeling of the scan data can subsequently derived from the electronic data. Note that the object type definitions are functional and consistency is more important than agreement to humanly applied labels.

In an attribute identification operation 25, at least some of the segmented objects output by the segmentation operation 20 are processed to identify attributes that describe the object. The identified attributes may vary depending upon the type of object. For example, a raster image is processed to identify attributes such as size, location, average color, color variance; a graphics object is processed to identify attributes such as size, location, cmyk color value(s). Accurate knowledge of each individual pixel property is not a requirement for subsequent processing as described below, and this provides an advantage to the present development in terms of reduced processing complexity.

Based upon the above processing, in a color identification operation 30, objects of constant color are identified in the original image data—referred to herein as "constant color objects." The term "constant color" is intended to encompass objects defined by pixels of identical color values (e.g., a single-color graphics object) and/or objects defined by pixels with low color variance. This can be understood regarding the following example: a photo of a solid green paint area might have a mean of 166 in the green channel, at the same time, the standard deviation of the patch might be 4 units. Or the photo of a red brick which would visually be considered "constant", in the actual image data might have a mean of 185 in the red channel, at the same time, the standard deviation of the patch might be 15 units. Preferably, as part of this color identification operation 30, only objects of constant color above a pre-defined spatial size threshold are identified, e.g., at least 1 cm by 1 cm in size or the equivalent of the total spatial area defined by the original image data. The constant color objects are identified in the step 30 in order to guide subsequent processing due to the fact that: (i) the constant color objects offer a higher visual distinction to a viewer of a hardcopy image and are thus more likely to be a source of a perceived mismatch between a new hardcopy and the legacy hardcopy; and, (ii) the constant color objects in the original image data allow for the identification of corresponding areas (i.e., areas printed based upon the constant color object data) in the legacy hardcopy (and scanner image data derived from the legacy hardcopy as described below). Examples of such constant color objects are large text areas (headlines) or logos or graphic elements, such as banners. Examples of constant color objects that show some variation in the digital data are compressed color objects, scans of color objects embedded in the digital data and the like. Small elements including small text are ignored, because it is well known that small text cannot be judged accurately with respect to color.

With continuing reference to FIG. 1, it can be seen that the legacy hardcopy 100 is also processed according to the present development. In a first operation 110, the legacy hardcopy is scanned to derive scanner image data that represent the legacy hardcopy 100. The present development requires that, for all or at least some of the original constant color objects identified in the original image data in step 30, a respective corresponding hardcopy color area be identified in the scanner image data. As such, in a step 120, the scanner image data file is processed to identify hardcopy color areas in the scanner image data that correspond respectively to, i.e., that were respectively printed based upon, the constant color objects identified in the original image data. A constant color object and its corresponding hardcopy color area represented in the scanner image data are referred to herein as a "color pair." A 100% success rate for the step 120 is not required, i.e., it is sufficient that at least one and preferably a plurality of color pairs be identified.

At this stage, the original image data and scanner image data, at least for the color pairs, are converted to a colorimetric color space in steps 40,140, respectively. As used herein, "colorimetric color space" is intended to mean any color space that can be converted to a standard CIE color space. Examples of a colorimetric color space include CIELab, Xerox RGB, PhotoYCC, sRGB and the like. As is known in the art, however, the conversion of scanner image data from a device-dependent color space to a colorimetric space requires a printing/marking device assumption, i.e., an assumption about the marking device that printed the image data. The printing device for the legacy hardcopy 100 is unknown but the possibilities are limited due to the "marking technology assumption" described above, i.e., that the legacy hardcopy was printed using a known conventional marking (printing) technology known in the art (e.g., offset, xerography, inkjet, etc.) rather than by hand or using some unconventional printing technique. In steps 40,140, at least one and preferably more of the color pairs of the original image data and scanner image data are converted to a colorimetric color space using a plurality of different printing device assumptions.

In a step 50, a color difference is determined between the members of each color pair in the colorimetric color space, for each printing device assumption. In other words, for one or more color pairs, a first color difference between the color pairs is determined for colorimetric color space data derived using a first printing device assumption; a second color difference between the same color pairs is determined for colorimetric color space data derived using a second printing device assumption; etc. Because the same printing device assumption is used for the members of a color pair, the number of color space conversions and color difference calculations is reduced from $N^2$ to N. Additional techniques such as described in U.S. Patent Application Publication No. 2004/

0264781 to Eschbach et al. and U.S. Patent Application Publication No. 2005/0134934 to Unal et al., both of which documents are hereby expressly incorporated by reference into the present specification, can be used too further reduce the number of possible conversions.

In a step 60, the printing device assumption that provides the smallest color difference between the members of at least one and preferably all of the color pairs is selected as the printing device assumption to be used for the remainder of the matching process in accordance with the present development. It should be noted that the device assumption selected in step 60 need not be "correct" in the sense that the legacy hardcopy 100 need not have been actually printed using the marking device corresponding to the selected device assumption.

Figure 2:
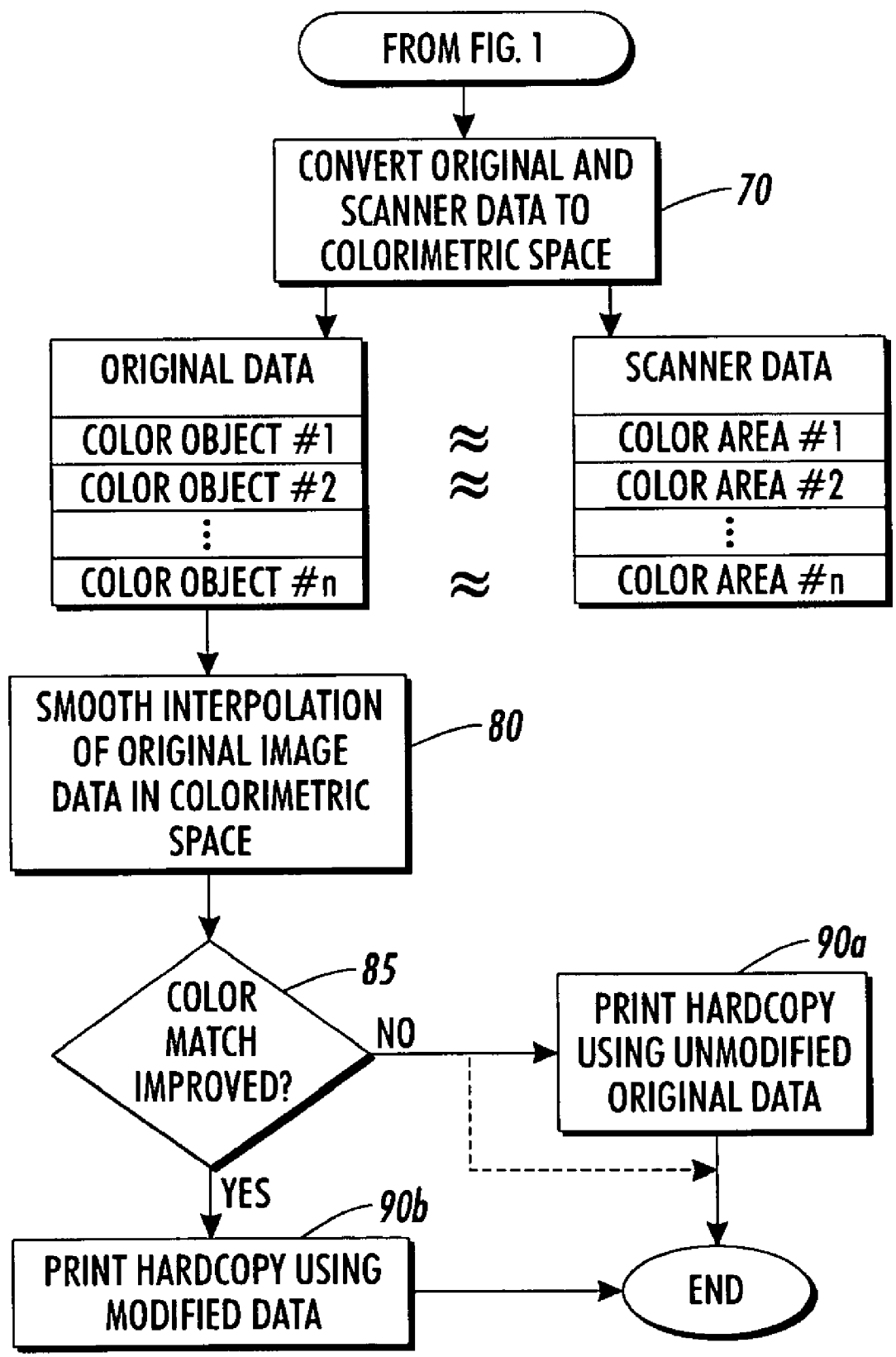
FIG. 2 is a diagrammatic illustration of a second portion of a system and method in accordance with the present development.

As shown in FIG. 2, in a step 70, the entire original image data file (or at least the constant color object data) and the entire scanner data file (or at least the hardcopy color area data) are converted to a colorimetric color space using the printing device assumption selected in step 60. Note that the colorimetric color space for step 70 is typically the same as the colorimetric color space described above with reference to FIG. 1, but can be a different colorimetric color space.

As shown in FIG. 2, the original image data and scanner image data are then both represented in a colorimetric color space, wherein the color pairs differ from each other in terms of color by only a small amount, where small refers to an amount that is in the order of variations commonly associated with machine variability and print enhancement/tuning. Then, a step 80 is carried out to smoothly interpolate the original image data so that the color difference for each color pair is minimized. The step 80 can be completed in several alternative variations. In one case, only those data corresponding to the constant color objects are adjusted in the colorimetric color space to match the color of their respective corresponding hardcopy color areas in the scanner data. In another embodiment, the entire original image data file is adjusted in the colorimetric color space so that each constant color object is adjusted to match the color of their respective corresponding hardcopy color areas in the scanner data. In either case, the color adjustment is carried out to adjust the average color of the object (or complete file) as a whole rather than as an independent adjustment of individual pixel color values on a pixel-by-pixel basis, i.e., if a particular pixel value x is mapped to x+3, this mapping will be done for all instances of the pixel value x instead of just certain instances of the pixel value x. Also, the black and white "luminance" values are preferably not adjusted.

As noted above, the present development is dependent on a "small perturbation assumption," i.e., an assumption that any enhancement of the original image data of the electronic file 10 was a limited and rational and smooth tuning of the original image data rather than a radical or arbitrary operation to obtain the legacy hardcopy. Examples of such a radical operation would be (1) the inversion of one channel, or (2) the exchange of the red and blue channel. As such, those of ordinary skill in the art will recognize that, if the small perturbation assumption is correct, smooth adjustment of the data defining the constant color objects (with or without the remainder of the original input data) will be possible in a manner that will reduce the color difference between each color pair.

A step 85 determines if color match between the color pairs is improved. This is accomplished by an automated calculation of the difference in colorimetric values and comparison of the difference to an acceptable tolerance threshold or, alternatively, by a user comparison of a video screen or proof print. If the color match is not improved, it is likely that the small perturbation assumption is not valid for the legacy hardcopy 100, and a new hardcopy is printed in a step 90*a* using the unmodified original image data file 10 as input to the printing process 90*a* or the process is terminated without any printing operation as indicated by the broken line. If the step 85 determines that color match is improved because the color difference between one or more color pairs is reduced or eliminated, a step 90*b* is carried out to print one or more new hardcopies using the adjusted original image data as output from the color-adjustment step 80 as input to the printing process 90*b*.

Figure 3:
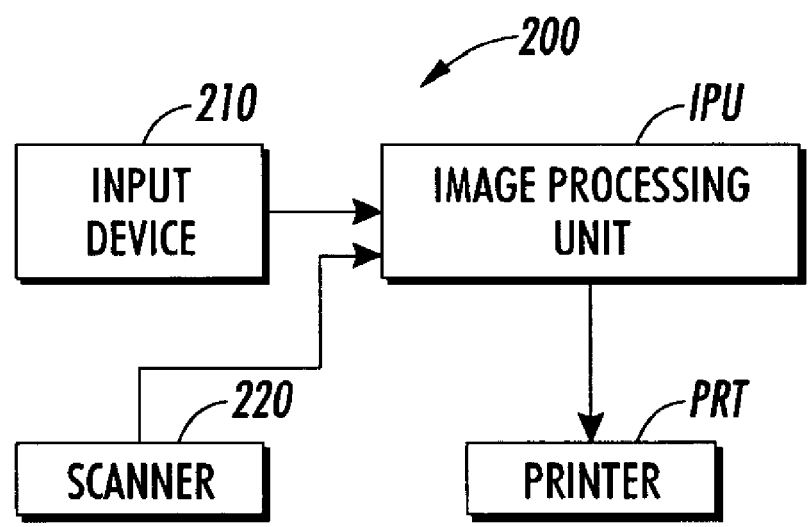
FIG. 3 illustrates a digital imaging apparatus for implementing a system and method in accordance with the present development.

FIG. 3 diagrammatically illustrates an example of a digital image processing apparatus 200 in which the system/method of the present development is implemented. The device comprises an input device 210 for input of the original image data file 10 from a disk, CD, random access memory, computer workstation, network connection or other data source. The device also comprises a scanner 220 for scanning the legacy hardcopy 100. The input device 210 and scanner 220 are connected to provide input to an image processing unit IPU that comprises a combination of hardware and software that perform digital image processing operations in accordance with the present development. The image processing unit IPU is connected to an image output device PRT comprising a print engine for depositing ink or toner on paper or another recording media in response to the output of the image processing unit. Typically, the image output device is a CMYK printer device as is known in the art.

It should be understood that the mapping between the color pairs can be implemented in a variety of ways. The first and most common way determines a multi-dimensional look-up table relating digital count values from the electronic original to new digital count values that should be printed to reproduce the hardcopy output, minus its physical deficiencies as noise, inks and the like. In an alternate implementation, the color pairs can be used to derive, e.g., via standard regression, a transformation matrix of predetermined dimensionality. A simple form would be the derivation of a 3×3 transformation matrix from the color pair data, or the derivation of gain and offset parameters.

It should also be noted that in the table implementation, table values that were not derived from the color pairs can be smoothly interpolated from neighboring color pairs. And, in cases where noise suppression is desired, a relaxation parameter can be used in such interpolations biasing the process towards the "no-operation" direction as is commonly done in all image processing scenarios in the presence of noise.

While particular embodiments have been described, alternatives, modifications, variations, improvements, and substantial equivalents that are or may be presently unforeseen may arise to applicants or others skilled in the art. Accordingly, the claims as filed and as they may be amended are intended to embrace all such alternatives, modifications variations, improvements, and substantial equivalents.

The invention claimed is:

1. A method for color matching original image data to a printed hardcopy document previously generated from said original image data, said method comprising:
inputting said original image data;
scanning said printed hardcopy to derive and input scanner image data that represent said printed hardcopy;
identifying constant color objects in said original image data;
for said constant color objects in said original image data, identifying respective corresponding hardcopy color areas in said scanner image data;
analyzing color differences between said constant color objects and the corresponding hardcopy color areas to determine a printing device assumption to predict a printing device on which said printed hardcopy document was previously printed;

based upon said predicted printing device, converting at least said constant color objects and said respectively corresponding hardcopy color areas into a colorimetric color space;

adjusting a color of at least one of the constant color objects to match a corresponding color of the respectively corresponding hardcopy color area in said colorimetric color space.

2. The method as set forth in claim 1, wherein said color of said at least one constant color object is adjusted by adjusting an average color.

3. The method as set forth in claim 2, wherein said color of said at least one constant color object is adjusted by adjusting said average color for all of said original image data.

4. The method as set forth in claim 3, wherein said average color is adjusted using a smooth interpolation of said average color.

5. The method as set forth in claim 2, wherein said average color is adjusted using a smooth interpolation of said average color.

6. The method as set forth in claim 1, wherein constant color objects defined in said original image data are ignored if less than a select spatial size.

7. The method as set forth in claim 1, wherein said step of analyzing color differences between said constant color objects and the hardcopy color areas respectively corresponding thereto to predict a printing device on which said printed hardcopy document was previously printed comprises:

converting said constant color objects and said hardcopy color areas to a colorimetric color space using each of a plurality of different printing device assumptions;

for each printing device assumption, determining a color difference between each constant color object and its respective corresponding hardcopy color area;

selecting the printing device assumption that results in said color difference being minimized.

8. The method as set forth in claim 1, wherein said step of inputting said original image data comprises subjecting said original image data to a Raster Image Processing (RIP) procedure to express said original image data as raster pixel data.

9. The method as set forth in claim 8, further comprising:
segmenting said original image data to identify said constant color objects in said original image data.

10. The method as set forth in claim 9, further comprising, for each identified constant color object, identifying at least one color attribute that describes a color characteristic of said constant color object.

11. The method as set forth in claim 10, wherein said at least one color attribute comprises average color.

12. A method for printing a new hardcopy using a legacy hardcopy and an electronic file comprising original image data, wherein the legacy hardcopy was printed from a modified version of the original image data, said method comprising:

inputting said original image data into an image processing unit;

scanning said legacy hardcopy to derive scanner data that describe said legacy hardcopy and inputting said scanner data into said image processing unit;

identifying a plurality of different color objects in said original image data;

identifying a plurality of different color areas in said scanner data, wherein said plurality of color areas correspond respectively to and result from said plurality of color objects identified in said original image data, wherein the color objects and the color areas corresponding respectively thereto define a plurality of color pairs;

converting the color pairs into a colorimetric color space;

for at least one color pair, adjusting an average color of the color object to match a corresponding average color of the corresponding color area so as to define adjusted image data;

printing the new hardcopy using the adjusted image data.

13. The printing method as set forth in claim 12, wherein said converting step comprises:

converting at least one color pair to a colorimetric color space using a plurality of different printing device assumptions;

selecting the printing device assumption that results in a minimum color difference between the color object and the color area of the at least one color pair;

using the selected printing device assumption to convert all of the original image data into said colorimetric color space.

14. The printing method as set forth in claim 13, wherein said step of adjusting an average color of the color object to match a corresponding average color of the corresponding color area so as to define adjusted image data for at least one color pair comprises:

adjusting the average color of all color objects to match a corresponding average colors of the corresponding color areas so as to define adjusted image data for all color pairs.

15. The printing method as set forth in claim 14, wherein said adjusting comprises adjusting an average color of said entire original image data electronic file including said color objects.

16. The printing method as set forth in claim 12, wherein said step of adjusting an average color of the color object to match a corresponding average color of the corresponding color area so as to define adjusted image data for at least one color pair comprises:

adjusting the average color of all color objects to match a corresponding average colors of the corresponding color areas so as to define adjusted image data for all color pairs.

17. The printing method as set forth in claim 16, wherein said adjusting comprises adjusting an average color of said entire original image data electronic file including said color objects.

18. A printing method comprising:

inputting an electronic file comprising original digital image data;

scanning a printed legacy hardcopy image that was previously printed from said electronic file to derive scanner image data;

identifying a constant color object in said original digital image data;

identifying a corresponding color area in said scanner image data that corresponds to said constant color object;

defining an adjusted electronic file comprising adjusted digital image data that represent said legacy hardcopy by adjusting a color of the constant color object in said original digital image data to match a corresponding color of the corresponding color area;

printing a new hardcopy using said adjusted digital image data.

19. The printing method as set forth in claim 18, wherein said step of defining an adjusted electronic file comprises adjusting the color of the constant color object in terms of a colorimetric color space in which said constant color object and said corresponding color area are represented.

20. The printing method as set forth in claim 19, further comprising:
determining a printing device on which said legacy hardcopy was printed, said determining step comprising:
using a plurality of different printing device assumptions to convert said constant color object and said corresponding color area into a colorimetric color space;
selecting as said printing device one of said plurality of printing device assumptions that minimizes a color difference between said constant color object and said corresponding color area; and,
using said printing device assumption to convert said original digital image data to said colorimetric color space.

* * * * *